United States Patent
Zhang et al.

(10) Patent No.: US 12,314,756 B2
(45) Date of Patent: May 27, 2025

(54) THREAD CONSTRUCTION METHOD AND DEVICE

(71) Applicant: Glenfly Tech Co., Ltd., Shanghai (CN)

(72) Inventors: Huaisheng Zhang, Shanghai (CN); Xiangxiang Chen, Shanghai (CN); Baohua Li, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 500 days.

(21) Appl. No.: 17/952,730

(22) Filed: Sep. 26, 2022

(65) Prior Publication Data
US 2024/0004702 A1    Jan. 4, 2024

(30) Foreign Application Priority Data
Jun. 30, 2022    (CN) .................. 202210756644.8

(51) Int. Cl.
*G06F 9/46* (2006.01)
*G06F 9/48* (2006.01)

(52) U.S. Cl.
CPC ............................. *G06F 9/4881* (2013.01)

(58) Field of Classification Search
CPC .... G06F 9/3887; G06F 9/4881; G06F 9/5066; G06F 2209/5018; G06F 2209/5017; G06F 2209/509
See application file for complete search history.

(56) References Cited

U.S. PATENT DOCUMENTS
2022/0261289 A1*   8/2022  Ashbaugh ........... G06F 12/0837

FOREIGN PATENT DOCUMENTS
CN    108694080 A  * 10/2018  ........... G06F 9/3851

* cited by examiner

*Primary Examiner* — Diem K Cao

(57) ABSTRACT

Disclosed are a thread construction method and device. The method includes: a workload is divided into a plurality of work groups; for any work group, a pattern type that matches a size of the any work group is selected, a target thread construction pattern is determined from a plurality of candidate thread construction patterns corresponding to the pattern type; a plurality of threads are constructed according to the target thread construction pattern; the threads are composed of a plurality of consecutive work items in the any work group; the work item index corresponding to at least one key work item in the work item sequence of each thread is cached and the work item index of each thread is obtained, which is configured to schedule the any work item corresponding to the thread to the processing unit.

17 Claims, 9 Drawing Sheets

---

The workload is divided into a plurality of work groups — S510

For any work group, a pattern type matching the size of the any work group is selected, and a target thread construction pattern is determined from the plurality of candidate thread construction patterns corresponding to the pattern type — S520

A plurality of threads is constructed according to the target thread construction pattern; the plurality of threads are composed of a plurality of consecutive work items in the any work group — S530

The work item index corresponding to at least one key work item in the work item sequence of each of the threads is cached, the work item index of each of the threads is obtained; the work item index is configured for scheduling any work item of a corresponding thread to a processing unit responsible for processing the thread. — S540

THREAD CONSTRUCTION METHOD AND DEVICE

CROSS-REFERENCE TO RELATED APPLICATIONS

The present application claims priority to Chinese patent application No. 202210756644.8, filed Jun. 30, 2022, entitled THREAD CONSTRUCTION METHOD AND DEVICE, the content of which is hereby incorporated by reference in its entirety.

TECHNICAL FIELD

The present disclosure relates to the technical field of graphics processors, and in particular, to a pattern-based thread construction method and device for general graphics processors.

BACKGROUND

With the rapid development of science and technology, the graphics processing unit (GPU) contains a large number of parallel processing units, which can be programmed to perform parallel computing of single instruction multiple data (SIMD), which makes GPU not only be capable of applying in hardware acceleration of graphics rendering, but also be capable of applying in parallel computing of general-purpose graphics processors, e.g., filtering and noise reduction of images, video compression, physical simulation, artificial intelligence, scientific computing, etc. The so-called GPGPU is short for general purpose computing on GPU in full name. With a rapid development of GPU in performance, the technology of using GPU to accelerate processing has gradually become a research hotspot.

SUMMARY

According to a first aspect, the present disclosure provides a thread construction method, including: dividing a workload into a plurality of work groups; for any work group of the plurality of work groups, selecting a pattern type that matches a size of the any work group, and determining a target thread construction pattern from a plurality of candidate thread construction patterns corresponding to the pattern type; constructing a plurality of threads according to the target thread construction pattern; the plurality of threads being composed of a plurality of consecutive work items in the any work group; and caching a work item index corresponding to at least one key work item in the work item sequence of each of the plurality of threads, and obtaining a work item index of each of the plurality of threads, the work item index being configured for scheduling any work item of a corresponding thread to a processing unit responsible for processing the thread.

In one of the embodiments, the determining the target thread construction pattern includes: acquiring a step pitch of each of the candidate thread construction patterns in at least one direction in a computing space; and determining, according to each step pitch and the size of the work group, a candidate thread construction pattern, whose quantitative relationship between the step pitch and the size of the work group satisfies a preset condition, as the target thread construction pattern.

In one of the embodiments, the constructing the plurality of threads according to the target thread construction pattern includes: acquiring a step pitch of the target thread construction pattern in at least one direction in a computing space; and constructing the plurality of consecutive work items in the any work group into the plurality of threads according to the step pitch.

In one of the embodiments, the key work item is a first work item in each of the threads, and the caching the work item index corresponding to at least one key work item in the work item sequence of each of the plurality of threads to obtain the work item index of each of the plurality of threads includes: acquiring a work group index, a local index and a global index corresponding to the first work item; determining a work item index corresponding to the key work item according to the work group index, the local index and the global index; and caching the key work item index to a cache unit.

In one of the embodiments, the method further includes: reading a work item index of the thread in the cache unit; and determining the thread construction pattern configured to construct the thread, and determining a work item index corresponding to the any work item according to the thread construction pattern and the work item index of the thread; the work item index corresponding to the any work item is configured for scheduling the any work item to the processing unit responsible for processing the thread.

In one of the embodiments, the determining the work item index corresponding the any work item includes: acquiring a thread construction pattern type; determining offset information between the any work item and the first work item according to the thread construction pattern type; and calculating a work item index corresponding to the any work item according to the offset information and the work item index corresponding to the first work item.

According to a second aspect, the present disclosure provides a thread construction device. The device includes a dividing module, a selecting module, a constructing module and a caching module.

The dividing module is configured to divide a workload into a plurality of work groups.

The selecting module is configured to, for any work group of the plurality of work groups, select a pattern type that matches a size of the any work group, and determine a target thread construction pattern from a plurality of candidate thread construction patterns corresponding to the pattern type.

The constructing module is configured to construct a plurality of threads according to the target thread construction pattern; the plurality of threads being composed of a plurality of consecutive work items in the any work group;

The caching module is configured to cache the work item index corresponding to at least one key work item in the work item sequence of each of the plurality of threads, and to obtain the work item index of each of the plurality of threads, the work item index being configured to schedule the any work item of a corresponding thread to the processing unit responsible for processing the thread.

In one of the embodiments, the determining module is specifically configured to acquire a step pitch of each of the candidate thread construction patterns in at least one direction in a computing space; and determine, according to each step pitch and the size of the work group, a candidate thread construction pattern whose quantitative relationship between the step pitch and the size of the work group satisfies a preset condition, as the target thread construction pattern.

In one of the embodiments, the constructing module is specifically configured to acquire a step pitch of the target thread construction pattern in at least one direction in the computing space, and construct a plurality of consecutive work items in the any work group into the plurality of threads according to the step pitch.

In one of the embodiments, the key work item is a first work item in each of the threads, and the caching module is specifically configured to acquire a work group index, a local index and a global index corresponding to the first work item, determine the work item index corresponding to the key work item according to the work group index, local index and global index, and cache the key work item index to the cache unit.

In one of the embodiments, the device further includes a reading module and a computing module. The reading module is configured to read the work item index of the thread in the cache unit. The computing module is configured to determine the thread construction pattern configured to construct the thread, and determine a work item index corresponding to the any work item according to the thread construction pattern and the work item index of the thread; wherein the work item index corresponding to the any work item is configured for scheduling the any work item to the processing unit responsible for processing the thread.

In one of the embodiments, the computing module is specifically configured to acquire a thread construction pattern type, determine offset information between the any work item and the first work item according to the thread construction pattern type, and calculate the work item index corresponding to the any work item according to the offset information and the work item index corresponding to the first work item.

In the aforementioned thread construction method and device, the workload is divided into the plurality of work groups; and for any work group, the pattern type that matches the size of the any work group is selected, and the target thread construction pattern is determined among the plurality of candidate thread construction patterns corresponding to the pattern type; then, the plurality of threads are constructed according to the target thread construction pattern; the threads are composed of the plurality of consecutive work items in the any work group. The work item index corresponding to at least one key work item in the work item sequence of each of the threads is cached to obtain the work item index of each of the threads, which is configured for scheduling the any work item corresponding to the thread to the processing unit responsible for processing the thread. In this way, a preset thread construction pattern can be adopted to quickly construct a plurality of compute shader (CS) threads for any work group. Meanwhile, just the work item index corresponding to at least one key work item needs to be calculated and recorded, then the work item index corresponding to any work item in the thread can be calculated synchronously based on the thread construction pattern adopted subsequently, such that the thread constructor does not need to generate the corresponding work item one by one when constructing the SIMD thread, which reduces the calculation time of the thread constructor and avoids occupying a large storage space, thereby improving the thread construction efficiency of the thread constructor.

BRIEF DESCRIPTION OF THE DRAWINGS

For a more complete understanding, reference is now made to the following description taken in conjunction with the accompanying Drawings in which.

DETAILED DESCRIPTION

Reference will be made to the accompanying drawings and embodiments to describe the present disclosure in detail, so that the objects, technical solutions and advantages of the present disclosure can be more apparent and understandable. It should be understood that the specific embodiments described herein are only used to explain the present disclosure, but not to limit the present disclosure.

Terms such as "first", "second" and "third" are used in the description and claims. However, those skilled in the art should understand that there is no sequential relationship between the aforementioned terms of rank or order, which are only for the convenience of description rather than limiting the order.

When the GPU hardware in the conventional technology constructs SIMD threads, the thread construction unit needs to generate index parameters for each of the work items one by one, which makes the thread construction unit consume a lot of computing time and needs to store the index parameter information of each of the work items, resulting in a low efficiency of thread construction and a large storage space. In view of this, the present disclosure provides a pattern-based thread construction method and a device thereof, which can improve the thread construction efficiency and greatly reduce the additional storage space.

Accordingly, it is necessary to provide a thread construction method and a device which are capable of improving an efficiency of thread construction in response to the aforementioned technical problems.

Figure 1A:
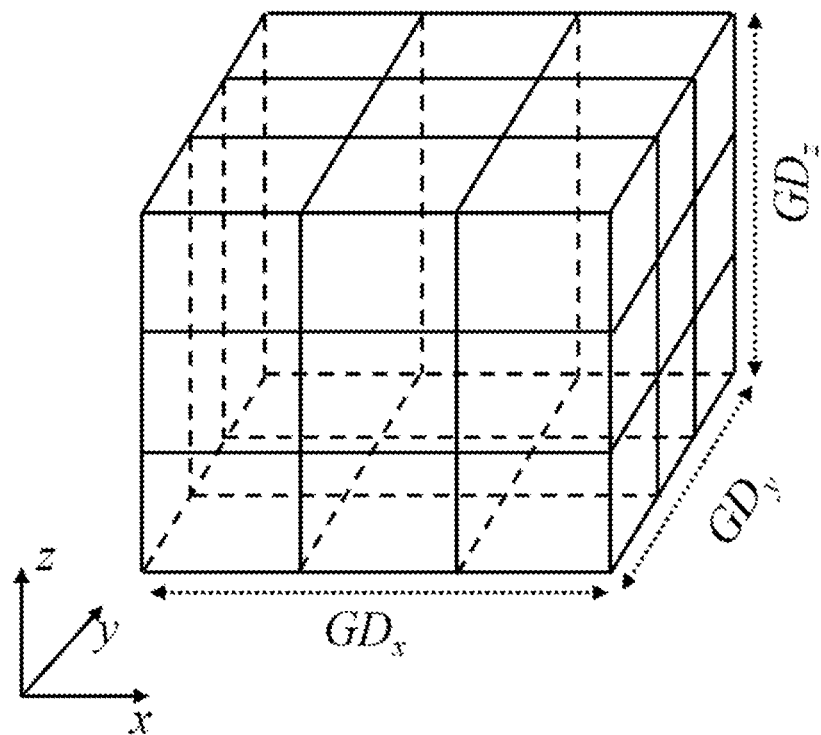
FIG. 1A is a three-dimensional schematic diagram of a graphics processor in a global size according to an embodiment of the present disclosure.

FIG. 1A is a three-dimensional schematic diagram of a graphics processor in a global size according to an embodiment of the present disclosure. As shown in FIG. 1A, a computing space is represented by the three-dimensional space of xyz, and the global size of the computing space, also known as workload, is represented by parameters GDx, GDy, and GDz in the x, y, z directions, respectively.

Figure 1B:
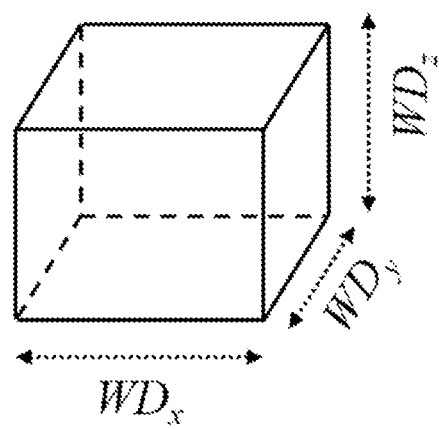
FIG. 1B is a three-dimensional schematic diagram of a work group of the graphics processor according to an embodiment of the present disclosure.

FIG. 1B is a three-dimensional schematic diagram of a work group of the graphics processor according to an embodiment of the present disclosure. FIG. 1B is a schematic diagram illustrating the global size of the graphics processor is divided into work groups (as shown in FIG. 1A, $GD_x$, $GD_y$ and $GD_z$ can be divided into three work groups in the x, y, z directions, including a total of 27 work groups, that is, including 27 small hexahedrons). The work group, also known as local size, is represented by parameters $WD_x$, $WD_y$, and $WD_z$ in the x, y, z directions, respectively.

In an embodiment of the present disclosure, the thread construction unit calculates the number of work groups (NW) in the three directions of xyz according to the global size of the computing space and the work group size, and the formula (1) adopted is as follows:

$$(NW_x, NW_y, NW_z) = (\text{Ceil}(GD_x/WD_x), \text{Ceil}(GD_y/WD_y), \text{Ceil}(GD_z/WD_z)) \quad (1)$$

Among them, $NW_x$, $NW_y$, and $NW_z$ represent the number of work groups that can be divided in the x, y, z directions according to the global size of the computing space respectively. The function Ceil represents rounding up the remainder. When the global size is divisible by the work group size, it means that the global size can be divided into an integer number of complete work groups at this time. However, when the global size is not divisible by the work group size, it means that the global size will construct some complete work groups and some incomplete work groups, and the incomplete work group is called the remainder work group.

For example, the three-dimensional size ($WD_x$, $WD_y$, $WD_z$) of the work group is (8, 8, 4), and the global size ($GD_x$, $GD_y$, $GD_z$) is (20, 20, 6), such that the total number of work groups of (3, 3, 2) is generated according to formula (1) that is, a remainder of 20/8 is rounded up to 3, and a remainder of 6/4 is rounded up to 2, A complete work group has a size of (8, 8, 4), and the remainder work group may have a size of (4, 8, 4), (8, 4, 4), (4, 4, 4), (8, 8, 2), (4, 8, 2), (8, 4, 2), (4, 4, 2).

Figure 2A:
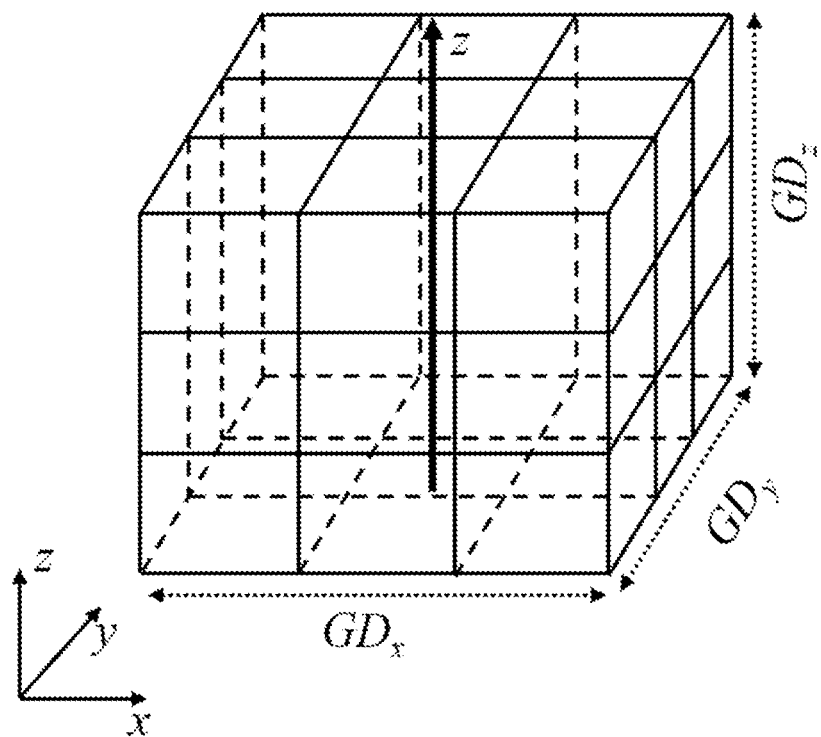
FIG. 2A is a three-dimensional division diagram of the work group according to an embodiment of the present disclosure.

FIG. 2A is a three-dimensional division of the work group according to an embodiment of the present disclosure. As shown in FIG. 2A, the thread construction unit is capable of dividing the work group according to the three-dimensional structure, and dividing the global size in the z-direction into N layers, where N is an integer greater than 0. That is, the global size in the z-direction indicated by the black arrow in FIG. 2A is divided into three layers.

Figure 2B:
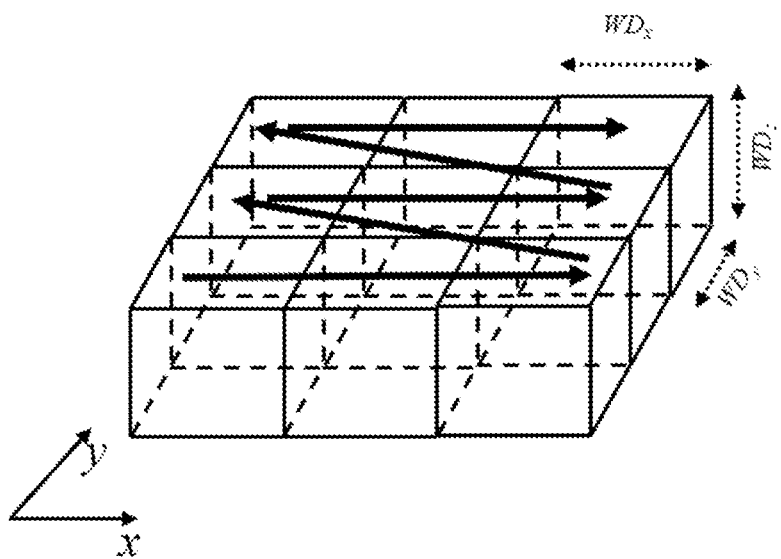
FIG. 2B is a two-dimensional division diagram of the work group according to an embodiment of the present disclosure.

FIG. 2B is a two-dimensional division diagram of the work group according to an embodiment of the present disclosure. As shown in FIG. 2B, for a certain layer in the z-direction, the layer is divided in a xy two-dimensional direction, and after the z layer is divided, the next z layer is divided. In the two-dimensional space of each of the layers, the x-direction is first divided, and then the y-direction is divided, that is, the division is performed in the order shown by the black arrow in FIG. 2B.

It should be noted here that, in the description section of FIG. 1B, the parameters ($WD_x$, $WD_y$, $WD_z$) are used to represent the three-dimensional work group size. Likewise, in the illustration in FIG. 2B, the sizes of a single work group in the three-dimensional direction are $WD_x$, $WD_y$, and $WD_z$, respectively. However, in the work of division of the work group described in FIG. 2B, it is performed in the order of division in the x-direction first, and then division in the y-direction. So, in the division result, a work group of each of the layers divided at the end, which is the remainder work group, may not have a size of a complete work group. In FIG. 2B, the last work group is marked as $WD_x$, $WD_y$, and $WD_z$ only to facilitate the understanding of the division principle, and does not mean that the work groups after division are all complete work groups. Those skilled in the art should understand that after the work groups are divided according to the three-dimensional structure, the remainder work groups may be obtained, and the present disclosure is not limited thereto.

It should also be noted here that, in the drawing process of FIG. 1A, FIG. 2A and FIG. 2B, the two-dimensional schematic diagram of the global size and the work group is divided into 3 in the x, y, z directions. However, those skilled in the art should understand that FIG. 1A, FIG. 2A and FIG. 2B are only for the convenience of illustration, and do not mean that the global size should be divided into 3 in the x, y, z directions and/or should be divided into the same number in the x, y, z directions. In other words, when the global size is divided into work groups, it can be divided into work groups of any integer number greater than 0 in the x, y, z directions respectively.

Figure 3:
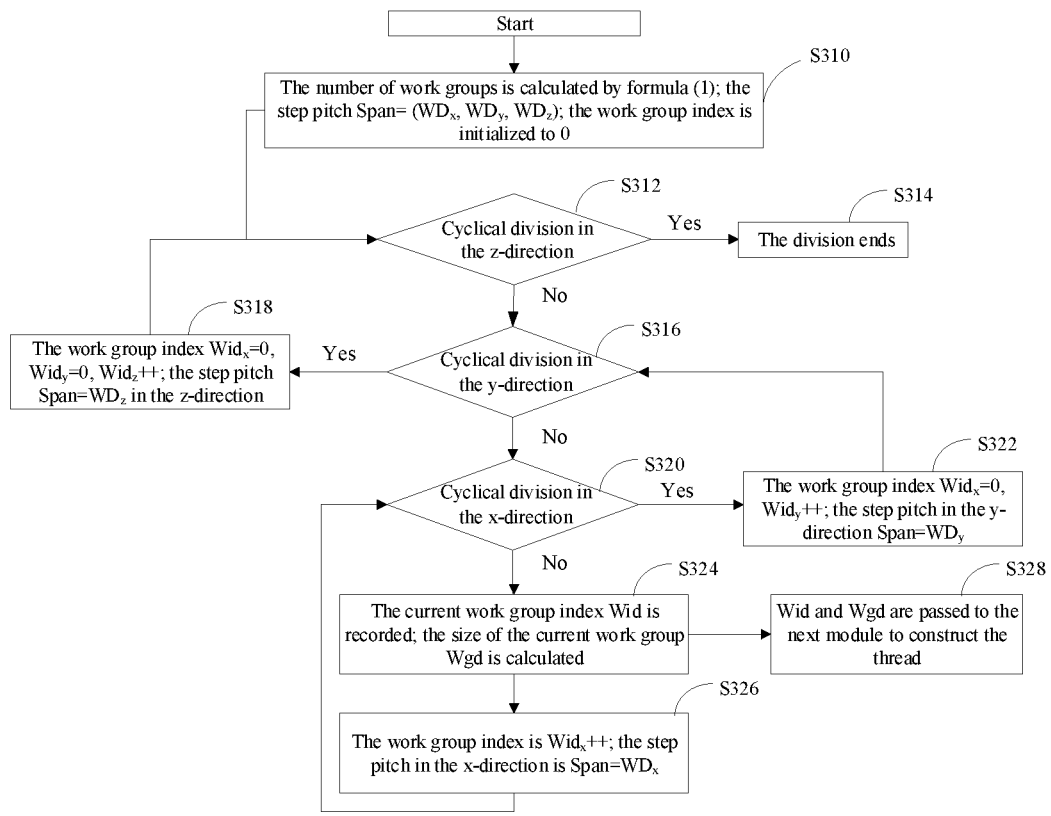
FIG. 3 is a flowchart of the division of the work group according to an embodiment of the present disclosure.

FIG. 3 is a flowchart of the division of the work group according to an embodiment of the present disclosure. As shown in FIG. 3, in step S310, the number of work groups is calculated by formula (1); the step pitch in the x, y, z directions is obtained by: Span=($WD_x$, $WD_y$, $WD_z$); the work group index is initialized to 0.

In the subsequent introduction, the step pitch Span in the x, y, z directions will be described by different abbreviations. For example, the step pitch Span will be directly adopted to represent the step pitch in the x-direction, and $WD_x$ may also be adopted to represent the step pitch in the x-direction. The aforementioned representations of step pitch will vary according to the usage habits. Alternatively, the aforementioned step pitch may also be replaced by other different nouns (e.g.: Stride).

In the formula (1) section, it has been introduced that the thread construction unit calculates the number of work groups NW in the three directions of xyz according to the global size of the computing space and the work group size. Please refer to the relevant content section, which will not be described here.

The size of the step pitch Span=($WD_x$, $WD_y$, $WD_z$) is the preset work group size; as shown in FIG. 1B, the work group size in the xyz three-dimensional direction is $WD_x$, $WD_y$, $WD_z$.

It should be noted here that the step pitch Span=($WD_x$, $WD_y$, $WD_z$) is preset as the size of the complete work group, not the size of the remainder work group. In other words, the remainder work group is not preset, but is the size of the incomplete work group remained after the global size of the computing space is divided according to the preset complete work group.

The thread construction unit is capable of constructing the work group into a plurality of threads according to a preset SIMD mode. The SIMD can be 32, 64 or others. If a thread is defined as SIMD32, then the thread includes 32 work items. If a thread is defined as SIMD64, then the thread includes 64 work items.

For each of the work items, the thread construction unit needs to compute and store the corresponding parameters as follows.

The first parameter is: work group index (Work Group ID), that is, the index of the work group to which the work item belongs, adopting triples and represented as follows: Wid=(Wid$_x$, Wid$_y$, Wid$_z$).

The second parameter is: local index (Local ID), that is, the index of the work item in the current work group, adopting triples and represented as follows: Lid=(Lid$_x$, Lid$_y$, Lid$_z$).

The third parameter is: global index (Global ID), that is, the index of the work item in the global space, adopting triples and represented as follows: Gid=(Gid$_x$, Gid$_y$, Gid$_z$). The global index may be calculated by formula (2) as follows:

$$Gid=(Gid_x,Gid_y,Gid_z)=(F_x+Wid_x*WD_x+Lid_x,F_y+ Wid_y*WD_y+Lid_y,F_z+Wid_z*WD_z+Lid_z) \quad (2)$$

Among them, F$_x$, F$_y$, and F$_z$ are offsets of the global space, that is Global Offsets. The detailed introduction of the global space offset will be introduced in detail in the content of the construction of the remainder work group, and will not be described in detail here.

In the aforementioned embodiments, the work group index is initialized to 0, that is, a triple of the work group index of the first parameter Wid=(Wid$_x$, Wid$_y$, Wid$_z$) is initialized to 0.

It is supplemented here that when the GPU executes, the aforementioned first, second and third parameters need to be pre-stored in the hardware cache, and then read out to use when the aforementioned parameters are used by the program instruction. However, each of the work items needs to store the aforementioned parameters, and a SIMD32 thread needs to store parameters of the 32 work items. When the GPU chip allows 32 threads to execute at the same time, it needs to store 32*32 work item parameters (that is, the first, second and third parameters), which will greatly consume hardware cache space. If it is a SIMD64 thread, it will consume more cache space.

Next, in step S312, whether the cyclical division in the z-direction has ended is determined. If the cyclical division in the z-direction has ended, it means that the division of the global size of the entire computing space has ended, and then go to step S314, where the division ends. If the cyclical division in the z-direction has not ended, then go to step S316.

Next, in step S316, whether the cyclical division in the y-direction has ended is determined. If the cyclical division in the y-direction has ended, then go to step S318, where the work group index Wid$_x$=0, Wid$_y$=0, Wid$_z$++; the step pitch Span=WD$_z$ in the z-direction; meanwhile, return to step S312 to continue the execution. If the cyclical division in the y-direction has not ended, then go to step S320.

Next, in step S320, whether the cyclical division in the x-direction has ended is determined. If the cyclical division in the x-direction has ended, then go to step S322, where the work group index Wid$_x$=0, Wid$_y$++; the step pitch in the y-direction Span=WD$_y$; meanwhile, return to step S316 to continue the execution. If the cyclical division in the x-direction has not ended, then go to step S324.

In step S324, the current work group index Wid is recorded; the size of the current work group Wgd is calculated.

In an embodiment of the present disclosure, the size of the current work group Wgd is calculated according to formula (3). If it is an edge work group, it may be a remainder work group, which will have a smaller size than the complete work group does.

$$Wgd = (Wgd_x, Wgd_y, Wgd_z) \quad (3)$$

$Wgd_x =$ if $(Wid_x < NW_x - 1)$ $WD_x$; else $(GD_x - Wid_x * WD_x)$ $Wgd_y =$ if $(Wid_y < NW_y - 1)$ $WD_y$; else $(GD_y - Wid_y * WD_y)$ $Wgd_z =$ if $(Wid_z < NW_z - 1)$ $WD_z$; else $(GD_z - Wid_z * WD_z)$ Next, in step S326, the work group index is Wid$_x$++; the step pitch in the x-direction is Span=WD$_x$; meanwhile, return to step S320 to continue the execution.

After step S324, step S328 is also executed, that is, the first parameter work group index Wid and the size of the current work group Wgd are passed to the next module to construct the thread. At this point, the division process of the work group has ended, and it is about to enter the thread construction process.

Regarding the description of calculating the size of the current work group Wgd and the sizes of the work group WD$_x$, WD$_y$, and WD$_z$ in the aforementioned step S324, the sizes of the work group WD$_x$, WD$_y$, and WD$_z$ refer to the preset sizes of the work groups, that is, the size of the complete work group. The size of the current work group Wgd refers to the work group size after the work group is divided. That is, the size of the current work group Wgd may be the preset sizes of the work group WD$_x$, WD$_y$, WD$_z$, or may be the size of the remainder work group (for example, the work group size at the edge). For this section of the content, please refer to the example description of formula (1) and formula (3), which will not be described in detail here.

Before introducing the pattern-based thread construction method in detail, it is necessary to supplement the linear pattern and the tile pattern.

The thread refers to a smallest unit that can run on an execution unit (EU) or a processing unit of the CPU, generally called a hardware thread (HW thread). If a thread is defined as SIMD32, that is, the thread includes 32 work items, a pattern can also be represented as a triple, which can be used to construct threads similar to the division of the work group. For SIMD32, the possible pattern can be represented as:

32×1×1, 8×4×1, 4×8×1, 16×2×1, 2×16×1, 1×32×1
16×1×2, 1×16×2, 8×2×2, 2×8×2, 4×4×2,
8×1×4, 1×8×4, 4×2×4, 2×4×4,
4×1×8, 1×4×8, 2×2×8,
2×1×16, 1×2×16,
1×1×32.

In order to simplify the hardware implementation, we may only consider the most commonly used cases, and choose two commonly used patterns, 32×1×1 and 8×4×1, which are called the linear pattern and the tile pattern, respectively. Similarly, the SIMD64 threads can be constructed with a 64×1×1 linear pattern and a 8×8×1 tile pattern.

Wherein, the three-dimensional vector of the linear pattern can be represented as 32×1×1 (For SIMD32) or 64×1×1 (For SIMD64), which is mainly used for the work group in the form of M×1×1, where the M vector here is generally a multiple of 32 or 64, or the remainder is relative large, such that each of the work groups can be created as threads in the number of Ceil (M/SIMD), SIMD can be 32 or 64, and the last thread may be not complete, which is a remainder thread.

In the linear pattern, for the constructed SIMD32 thread, the order of the work items in the work item sequence is 0-31, as shown in Table 1:

TABLE 1

| The Work Item Sequence of The Linear pattern For SIMD32 | | | | | | | | |
|---|---|---|---|---|---|---|---|---|
| 0 | 1 | 2 | 3 | ... | 28 | 29 | 30 | 31 |

In the linear pattern, for the constructed SIMD64 thread, the order of the work items in the work item sequence is 0-63, as shown in Table 2:

TABLE 2

| The Work Item Sequence of The Linear pattern For SIMD64 | | | | | | | | |
|---|---|---|---|---|---|---|---|---|
| 0 | 1 | 2 | 3 | ... | 60 | 61 | 62 | 63 |

Threads constructed adopting different thread construction patterns have different index offset tables: for example, for a 512×1×1 work group, 16 SIMD32 threads or 8 SIMD64 threads can be created.

Their index offset tables are Table 3 and Table 4, respectively, which will be used to calculate the second parameter Local ID and third parameter Global ID of the work item:

TABLE 3

| The Index Offset Table of The Linear pattern For SIMD32 | | | | | | | | |
|---|---|---|---|---|---|---|---|---|
| 0/0/0 | 1/0/0 | 2/0/0 | 3/0/0 | ... | 28/0/0 | 29/0/0 | 30/0/0 | 31/0/0 |

TABLE 4

| The Index Offset Table of The Linear pattern For SIMD64 | | | | | | | | |
|---|---|---|---|---|---|---|---|---|
| 0/0/0 | 1/0/0 | 2/0/0 | 3/0/0 | ... | 60/0/0 | 61/0/0 | 62/0/0 | 63/0/0 |

In this way, if the local index $Lid_0$ and the global index $Gid_0$ of a first work item in the thread are known, the local index $Lid_i$ and the global index $Gid_i$ of other work items in the thread can be calculated by using the aforementioned index offset table.

The local index $Lid_i$ and global index $Gid_i$ of other work items can be represented as:

$Lid_i = Lid_0 + off_i;$ $Gid_i = Gid_0 + off_i;$

Among them, i=0 . . . 31/63, and $off_i$ is an offset triplet in Table 3 and Table 4.

The three-dimensional size of the tile pattern is 8×4×1 (for SIMD32) or 8×8×1 (for SIMD64), which is mainly used in work group with a form of M×N×1, where M and N are generally multiples of 8, such that each of the work groups can be created as threads with the number of Ceil (M/8)*Ceil (N/p), p can be 4 or 8, and the threads on the edge may be not complete, which is the remainder thread.

For example, a 32×16×1 work group can create 16 SIMD32 threads, or 8 SIMD64 threads. This kind of tile pattern is often used for the reading and the writing of a plurality of two-dimensional images, or three-dimensional images. As long as the length and the width of the images are multiples of 8, the images can be easily constructed into tile patterns. But for a work group in the form of 1×M×N, the tile pattern method is not suitable, because it will cause each of the threads to process only one work item on average, resulting in a waste of resources. For this kind of work group, we still use the conventional method, that is, processing each of the work items separately, and place a plurality of work items in the z-direction into a thread.

Figure 4:
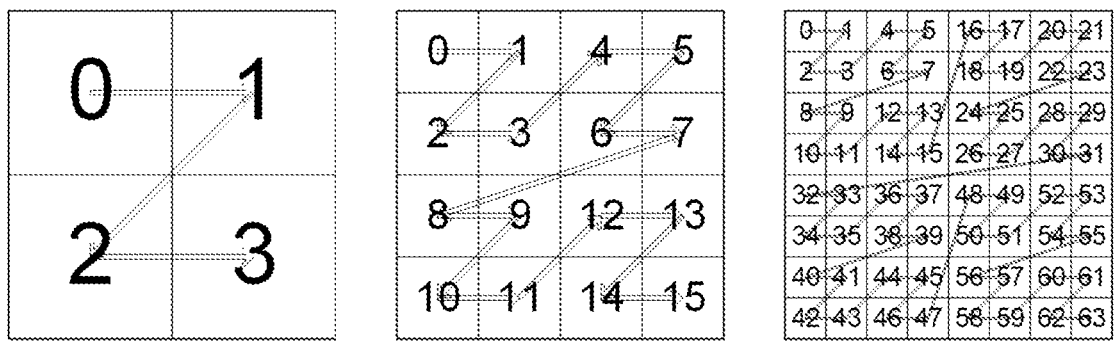
FIG. 4 is a schematic diagram of a Morton curve according to an embodiment of the present disclosure.

The data of the image is often organized according to a Morton curve, also called a z-order curve, as shown by the arrow in FIG. 4.

The information such as the color of the pixels organized according to the position of the Morton curve is closely arranged, and it is easy to fall on the same cache address. In this way, if the work items are also organized and arranged into a thread according to the Morton curve, then when reading and writing the data of the image, it is easy to hit/miss at the same cache address, which greatly improves a utilization of the cache performance. This is the advantage of the tile pattern for image reading and writing. The organization of the Morton curve should belong to the known technology of those skilled in the art, and will not be described in detail here.

In the tile pattern, an 8×4 work item sequence as shown in Table 5 is obtained from the 32 work items of SIMD32 according to the Morton curve:

TABLE 5

| Work Item Sequence of The Tile Pattern of SIMD32 | | | | | | | |
|---|---|---|---|---|---|---|---|
| 0 | 1 | 4 | 5 | 16 | 17 | 20 | 21 |
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |

In the tile pattern, an 8×8 work item sequence as shown in Table 6 is obtained from the 64 work items of SIMD64 according to the Morton curve:

TABLE 6

| Work Item Sequence of The Tile Pattern of SIMD64 | | | | | | | |
|---|---|---|---|---|---|---|---|
| 0 | 1 | 4 | 5 | 16 | 17 | 20 | 21 |
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

Table 7 and Table 8 shows the index offsets thereof, which will be used to calculate the second parameter Local ID and the third parameter Global ID for all work items:

In the tile pattern, the index offset table for the 32 work items of SIMD32 is as follow:

TABLE 7

| Index Offset Table of The Tile Pattern of SIMD32 | | | | | | | |
|---|---|---|---|---|---|---|---|
| 0/0/0 | 1/0/0 | 2/0/0 | 3/0/0 | 4/0/0 | 5/0/0 | 6/0/0 | 7/0/0 |
| 0/1/0 | 1/1/0 | 2/1/0 | 3/1/0 | 4/1/0 | 5/1/0 | 6/1/0 | 7/1/0 |
| 0/2/0 | 1/2/0 | 2/2/0 | 3/2/0 | 4/2/0 | 5/2/0 | 6/2/0 | 7/2/0 |
| 0/3/0 | 1/3/0 | 2/3/0 | 3/3/0 | 4/3/0 | 5/3/0 | 6/3/0 | 7/3/0 |

In the tile pattern, the index offset table for the 64 work items of SIMD64 is as follow:

TABLE 8

Index Offset Table of The Tile Pattern of SIMD64

| | | | | | | | |
|---|---|---|---|---|---|---|---|
| 0/0/0 | 1/0/0 | 2/0/0 | 3/0/0 | 4/0/0 | 5/0/0 | 6/0/0 | 7/0/0 |
| 0/1/0 | 1/1/0 | 2/1/0 | 3/1/0 | 4/1/0 | 5/1/0 | 6/1/0 | 7/1/0 |
| 0/2/0 | 1/2/0 | 2/2/0 | 3/2/0 | 4/2/0 | 5/2/0 | 6/2/0 | 7/2/0 |
| 0/3/0 | 1/3/0 | 2/3/0 | 3/3/0 | 4/3/0 | 5/3/0 | 6/3/0 | 7/3/0 |
| 0/4/0 | 1/4/0 | 2/4/0 | 3/4/0 | 4/4/0 | 5/4/0 | 6/4/0 | 7/4/0 |
| 0/5/0 | 1/5/0 | 2/5/0 | 3/5/0 | 4/5/0 | 5/5/0 | 6/5/0 | 7/5/0 |
| 0/6/0 | 1/6/0 | 2/6/0 | 3/6/0 | 4/6/0 | 5/6/0 | 6/6/0 | 7/6/0 |
| 0/7/0 | 1/7/0 | 2/7/0 | 3/7/0 | 4/7/0 | 5/7/0 | 6/7/0 | 7/7/0 |

As the above linear pattern, if the local index $Lid_0$ and global index $Gid_0$ of the first work item are known, then the local index $Lid_i$ and global index $Gid_i$ of other work items are respectively represented as $$Lid_i = Lid_0 + off_i;$$

$$Gid_i = Gid_0 + off_i;$$

Among them, i=0 . . . 31/63, and offs is the offset triplet in Table 7 and Table 8.

Figure 5:
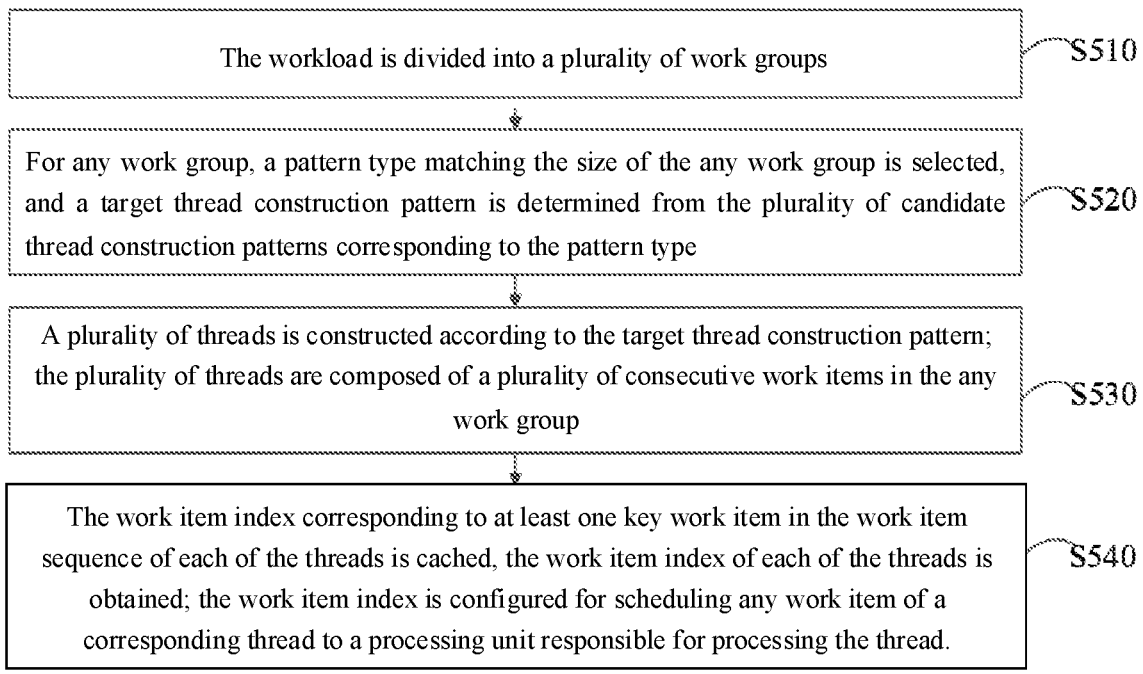
FIG. 5 is a flowchart of a thread construction method according to an embodiment of the present disclosure.

FIG. 5 is a flowchart of a thread construction method according to an embodiment of the present disclosure. As shown in FIG. 5, in step S510, the workload is divided into a plurality of work groups.

The workload may refer to the workload corresponding to the current computing task.

In the specific implementation, the module of the graphics processor responsible for constructing the compute shader, (CS) thread is called CS thread constructor (CSTC), which is divided into two parts. The first part is for the division of the CS work group, and the second part is to construct a CS thread for each of the work groups.

When the CS thread constructor performs CS work group division, the CS thread constructor may divide the workload into a plurality of work groups according to a preset work group division sequence. Regarding how to divide the workload into work groups, reference may be made to the aforementioned descriptions in FIGS. 1 to 3, which are not described here.

Next, in step S520, for any work group, a pattern type matching the size of the any work group is selected, and a target thread construction pattern is determined from the plurality of candidate thread construction patterns corresponding to the pattern type.

Next, in step S530, a plurality of threads is constructed according to the target thread construction pattern. The plurality of threads are composed of a plurality of consecutive work items in the any work group.

Among them, the pattern types include a linear pattern and a tile pattern.

In a specific implementation, for any work group, the CS thread constructor may choose a pattern type that matches the size of the any work group. Specifically, the CS thread constructor may determine, according to the size of the any work group, whether a linear pattern can be used to construct a CS thread for the any work group.

If the any work group can use a linear pattern to construct CS threads, the CS thread constructor will determine the target thread construction pattern from a plurality of candidate threads construction pattern corresponding to the linear pattern (for example, the threads construction pattern corresponding to linear patterns such as 32×1×1, 8×1×1, 4×1×1, 16×1×1, 2×1×1, etc.). Then, the CS thread constructor constructs, according to the target thread construction pattern, a plurality of threads for the any work group.

If the any work group cannot use the linear pattern to construct CS threads, the CS thread constructor determines whether the any work group can use the tile pattern to construct the CS threads. If the any work group can use the tile pattern to construct the CS threads, the CS thread constructor determines the target thread construction pattern from a plurality of candidate thread construction patterns corresponding to the tile pattern (for example, the thread construction patterns corresponding to tile patterns of 8×4× 1, 4×8×1, 16×2×1, 2×16×1, 8×8×1 and so on).

After the CS thread constructor determines the target thread construction pattern for the any work group, the CS thread constructor can construct a plurality of threads according to the target thread construction pattern. Each of the threads is composed of a plurality of consecutive work items in the any work group. Specifically, the CS thread constructor can divide the work items in the any work group according to the division method corresponding to the target thread construction pattern to obtain a plurality of threads.

Next, in step S540, the work item index corresponding to at least one key work item in the work item sequence of each of the threads is cached, the work item index of each of the threads is obtained. The work item index is configured for scheduling any work item of a corresponding thread to a processing unit responsible for processing the thread.

The aforementioned key work item may refer to the first work item in a known thread. It can also refer to a work item of any one of the known work item indexes of a plurality of consecutive work items in any work group included by the thread (in other words, a work item whose work item index has been stored in the cache space). That is to say, the work item index of the work item can derive other work item indexes according to the offset table and the index calculation formula, and then the work item can be defined as a key work item.

After the CS thread constructor completes the division of a plurality of work items in any work group and obtains the corresponding thread, the CS thread constructor can store the parameter information of the first work item of the thread (that is, the key work item index parameter) to obtain the work item index of the thread. Certainly, the CS thread constructor may also store the work item index corresponding to any work item in the plurality of consecutive work items included in the thread into the cache space, to obtain the work item index of the thread.

In this way, the graphics processor can schedule any one of the work items in the thread to the processing unit responsible for processing the thread according to the work item index of the thread. Specifically, the graphics processor may use the work item index corresponding to the thread to derive other work item indexes according to the offset table and the index calculation formula, and the other work item index may refer to the work item index corresponding to any work item in the thread, and then the graphics processor may schedule any work item to the processing unit responsible for processing the thread based on the work item index corresponding to the any work item.

In the aforementioned thread construction method, the workload is divided into a plurality of work groups. For any work group, a pattern type that matches the size of the any work group is selected, and a target thread construction pattern is determined from a plurality of candidate thread construction patterns corresponding to the pattern type. Then, a plurality of threads are constructed according to the target thread construction pattern. The thread is composed of a plurality of consecutive work items in the any work group. The work item index corresponding to at least one key work item in the work item sequence of each of the threads is cached to obtain the work item index of each of the threads, which is configured to schedule any one of the work items corresponding to the thread to the processing unit responsible for processing the thread. In this way, the preset thread construction pattern can be adopted to quickly construct a plurality of compute shader (CS) threads for any work group, and meanwhile, only the work item index corresponding to at least one key work item needs to be calculated and recorded, and the work item index corresponding to any work item in the thread can be calculated synchronously based on the adopted thread construction pattern subsequently, such that the thread constructor does not need to generate the corresponding work item index for each work item one by one when constructing the SIMD thread, which reduces the calculation time of the thread constructor and avoids occupying a large storage space, thereby improving the thread construction efficiency of the thread constructor.

Figure 6:
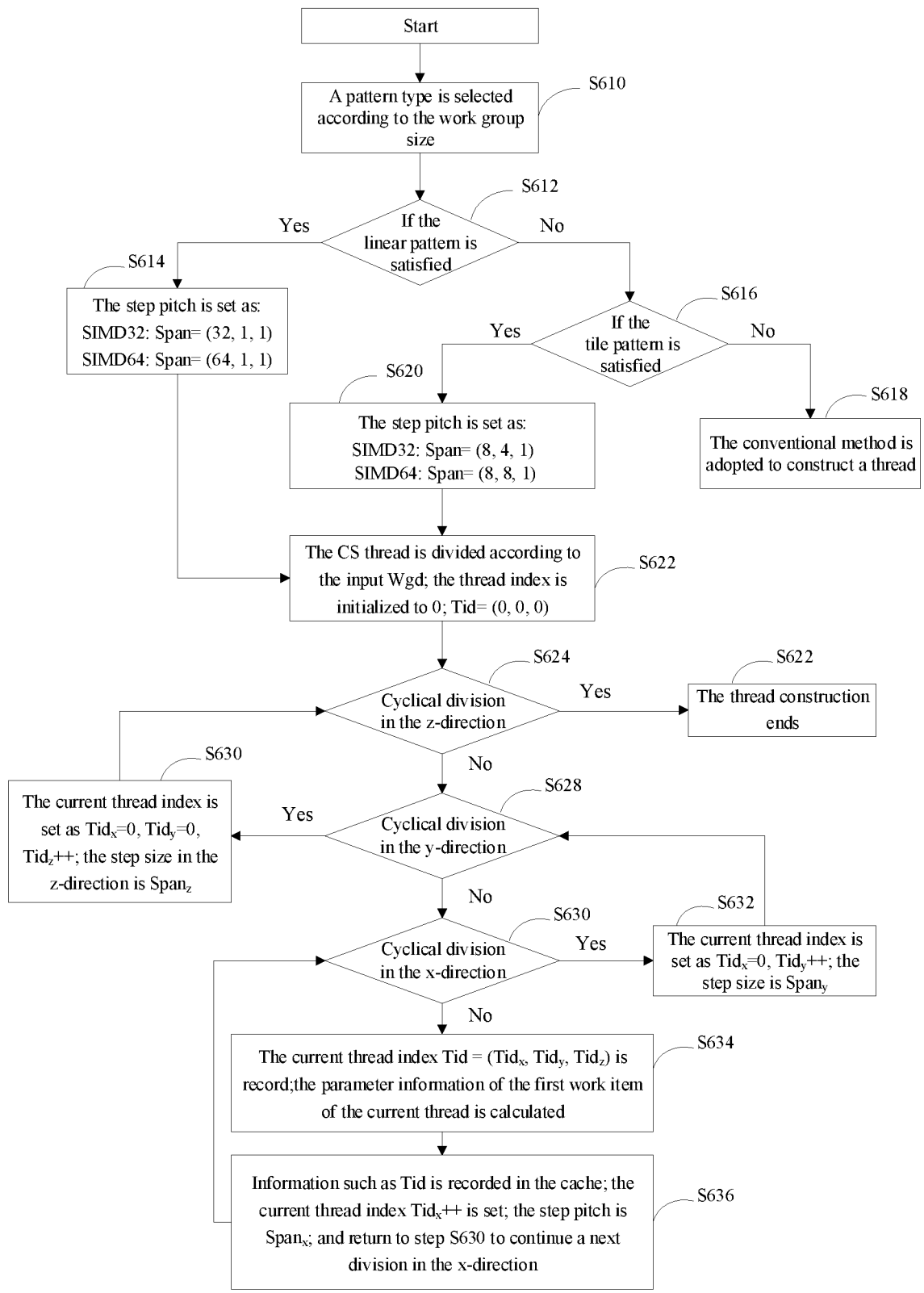
FIG. 6 is a flowchart of the thread construction according to an embodiment of the present disclosure.

FIG. 6 is a flowchart of the thread construction according to an embodiment of the present disclosure. As shown in FIG. 6, in step S610, an appropriate pattern type is selected for the global size according to the pre-defined work group size.

Next, in step S612, it is determined whether the global size satisfies the linear pattern. If it is determined as "Yes", go to step S614, where the step pitch is set as: SIMD32: Span=(32, 1, 1) or SIMD64: Span=(64, 1, 1), and go to step S622.

If it is determined as "No", then go to step S616, and continue to determine whether the global size satisfies the tile pattern.

If it continues to be determined as "No", i.e., the global size does not satisfy the tile pattern, then go to step S618, where the conventional method is used to construct a thread. That is, the global size satisfies neither the linear pattern nor the tile pattern, such that the pattern-based thread construction method is not adopted.

If it is determined as "Yes", then go to step S620, where the step pitch is set as: SIMD32: Span=(8, 4, 1) or SIMD64: Span=(8, 8, 1), and go to step S622.

Next, in step S622, the CS thread is divided according to the input size of the current work group Wgd and step pitch (step pitch of the adopted pattern) Span; the thread index is initialized to 0; Tid=(0, 0, 0).

Next, in step S624, a cyclical division is performed in the z-direction of the computing space of the work group, and if the cyclical division in the z-direction has ended, then go to step S626, where the thread construction ends.

Next, if the cyclical division in the z-direction has not end, continue to go to step S628, and then the cyclical division is performed in the y-direction.

If the cyclical division in the y-direction has ended, then go to step S630, where the current thread index is set as $Tid_x=0$, $Tid_y=0$, $Tid_z$++; the step size in the z-direction is $Span_z$ (for example: $Span_z$ of the linear pattern and $Span_z$ of the tile pattern are both "1"), and return to step S624 to continue the execution of the next division in the z-direction.

If the cyclical division in the y-direction has not ended, then continue to go to step S630, and then the cyclical division is performed in the x-direction.

If the cyclical division in the x-direction has ended, then go to step S632, where the current thread index is set as $Tid_x=0$, $Tid_y$++; the step size is $Span_y$ (for example: the step pitch $Span_y$ of the linear patterns SIMD32 and the step pitch $Span_y$ of the linear patterns SIMD64 are both "1"; and the step pitch of the tile pattern SIMD32 $Span_y$ is "4", the step pitch of the tile pattern SIMD64 $Span_y$ is "8"), and returns to step S628 to continue to execute the next division in the y-direction.

If the cyclical division in the x-direction has not ended, then go to step S634, where the current thread index $Tid=(Tid_x, Tid_y, Tid_z)$ is recorded; the index parameter information of the first work item of the current thread is calculated. The graphics processor may acquire the work group index, the local index and the global index corresponding to the first work item of each of the threads. The work item indexes of the work items of each thread are determined according to the work group index, the local index and the global index.

Next, go to step S636, where information such as the thread index Tid is recorded in the cache, which is configured for subsequent instruction calculation; the current thread index $Tid_y$++ is set; the step pitch is Spam; and return to step S630 to continue a next division in the x-direction.

In the pattern-based thread construction process shown in FIG. 6, when selecting an appropriate pattern type for the global size according to the pre-defined work group size, determining whether the work group satisfies the linear pattern is first performed in step S612, if the work group does not satisfy the linear pattern, then continue to determine whether the work group satisfies the tile pattern in step S616. It should be pointed out here that the aforementioned steps S612 and S616 are not actually related in sequence. In other words, it is also possible to give priority to determining whether the work group satisfies the tile pattern, and if not, then continue to determine whether work group satisfies the linear pattern. Alternatively, steps S612 and S616 may also be performed simultaneously, that is, it is determined whether the work group satisfies the linear pattern or the tile pattern simultaneously.

It should also be noted that the step pitch Span is exemplarily given in steps S614 and S620, and the step pitch Span may be configured with computer hardware resources, and the present disclosure is not limited thereto.

In another embodiment, when the work group is divided and the threads are constructed according to different candidate thread construction patterns, the step pitch varies with different candidate thread construction patterns. The aforementioned step S612 for determining whether the work group satisfies the linear pattern and step S616 for determining whether the work group satisfies the tile pattern can be set to determine whether the quantitative relationship between the work group size and the step pitches corresponding to the different candidate thread construction patterns satisfies a preset condition. The candidate thread construction pattern that satisfies the preset condition is used as the target thread construction pattern.

The aforementioned preset condition will be described in detail in FIGS. 7 to 10 according to an example. Please refer to the relevant content section, which will not be described here.

In a specific implementation, the graphics processor may acquire the work group size of any work group in at least one direction in the computing space in the process of determining the thread construction pattern for the any work group. According to the size of each of the work groups, a thread construction pattern for any work group is determined from at least one preset candidate thread construction pattern. The graphics processor may acquire the step pitch of at least one candidate thread construction pattern in each of the directions. The corresponding step pitch and the work group size are configured to have adaptive dimensions according to each of the step pitches and the work group size. For example, the graphics processor may determine a pattern type (the linear pattern and the tile pattern) which is adaptive to the corresponding dimension of the work group size. The graphics processor may then determine the target division pattern from the plurality of candidate thread construction patterns corresponding to the pattern type. Finally, the graphics processor may use the candidate thread construction pattern corresponding to the target division pattern as the thread construction pattern for the any work group.

For example, it is known that the size of work group W is 512×1×1, and the candidate thread construction patterns include a candidate thread construction pattern A (64,1,1), a candidate thread construction pattern B (32,1,1) and a candidate thread construction pattern C (32, 16, 1). It can be seen that both the sizes of the work group W in the y-direction and z-directions are "1" and satisfies the condition that the size of the work group W in the x-direction is the multiple of the linear pattern or the remainder is relative large, then the graphics processor determines that the work group W may adopt a linear pattern for thread construction. The graphics processor determines the thread construction pattern of the work group W from the linear patterns (e.g., candidate thread construction pattern A and candidate thread construction pattern B). In practical applications, the graphics processor may select the target candidate thread construction pattern as the thread construction pattern of the work group W from the candidate thread construction pattern A and the candidate thread construction pattern B according to the SIMD type.

In practical applications, since the work group size used by most applications is relatively regular, some selection criteria of pattern types can be defined to improve the utilization of EU (processing unit).

The SIMD of each of the CS threads is preset by the driver, which may be SIMD32 or SIMD64. If the work group size is ($WD_x$, $WD_y$, $WD_z$), first the graphics processor checks to see if a linear pattern can be adopted. Specifically, if the work group $WD_x$ is divisible by 32 (for SIMD32) or 64 (for SIMD64), then a linear boilerplate can be adopted.

If it is not divisible, then check the remainder part. If the remainder part can exceed half the thread size (16 for SIMD32 or 32 for SIMD64), then a linear pattern can be adopted. The last CS thread in each of the x-directions is not full and is called the remainder thread.

The total number of threads created is Ceil ($WD_x$/p) *$WD_y$*$WD_z$, where p is 32 or 64.

Figure 7:
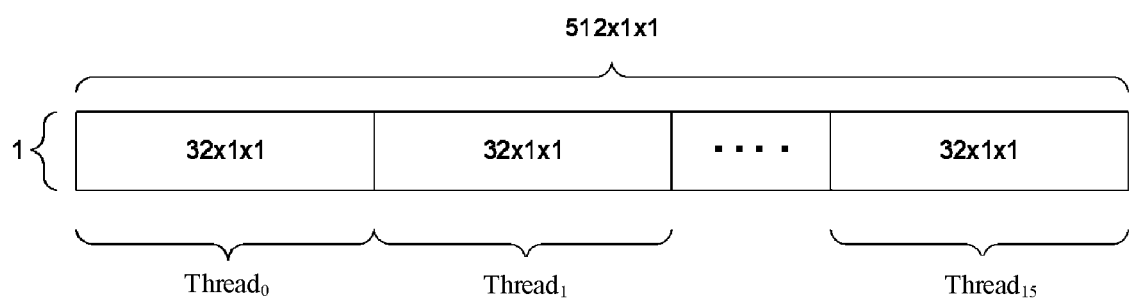
FIG. 7 is a schematic diagram of a thread construction according to a linear pattern according to an embodiment of the present disclosure.

Taking SIMD32 as an example, for a work group of 512×1×1, a linear pattern of 32×1×1 can be used to create 16 SIMD32 CS threads, each of the threads includes exactly 32 work items, as shown in FIG. 7. The creating process may only need to execute 16 cycles, avoiding separate calculations for each of the work items.

Figure 8:
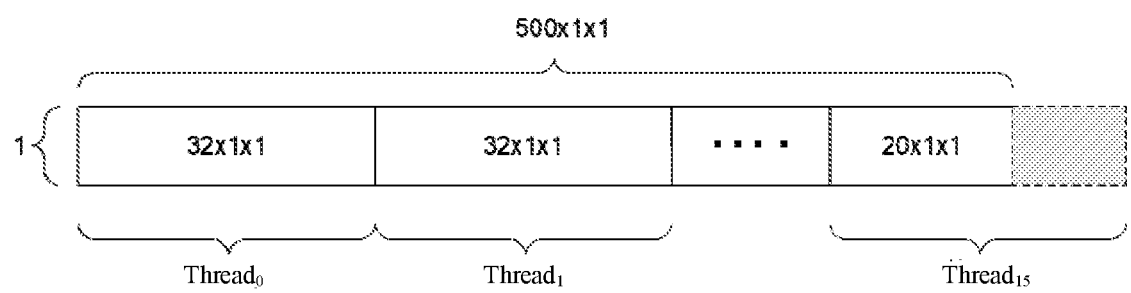
FIG. 8 is a schematic diagram of another thread construction based on the linear pattern according to an embodiment of the present disclosure.

If the work group size is 500×1×1, 500%32=20, and the remainder is greater than 16, as shown in FIG. 8, a linear pattern can be used, then the total number of threads created is: Ceil (500/32)*1*1=16. Each of the 15 CS threads on the front includes 32 work items, but the last thread has only 20 work items and is the remainder thread.

If the work group size does not satisfy the linear pattern, then test whether the tile pattern can be used.

Figure 9:
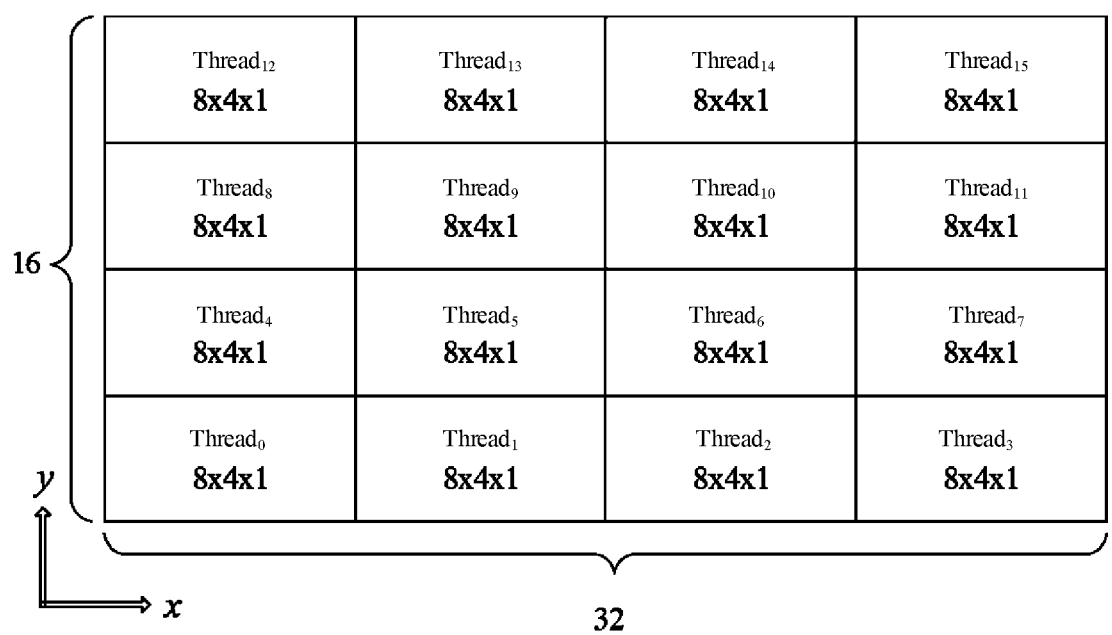
FIG. 9 is a schematic diagram of a thread construction based on a tile pattern according to another embodiment of the present disclosure.

Specifically, taking SIMD32 as an example, such as a work group of 32×16×1, as shown in FIG. 9, since $WD_x$ and $WD_y$ of the work group are both divisible by 8, the tile pattern of 8×4×1 can be adopted, and all the generated CS threads include 32 work items. This step may only need to be performed 16 times, avoiding the execution of each of the work items.

If it is not divisible, then check the remainder part, for the SIMD32 thread, if the remainder of $WD_x$/8 is greater than 4, and the remainder of $WD_y$/4 is greater than 2; for the SIMD64 thread, if both the remainders of $WD_x$/8 and $WD_y$/8 are greater than 4, then the tile pattern can be adopted, the last thread of each row or each column may be unsatisfied, that is, the number of work items in the last thread of each row or each column is less than the number of work items in other threads.

Figure 10:
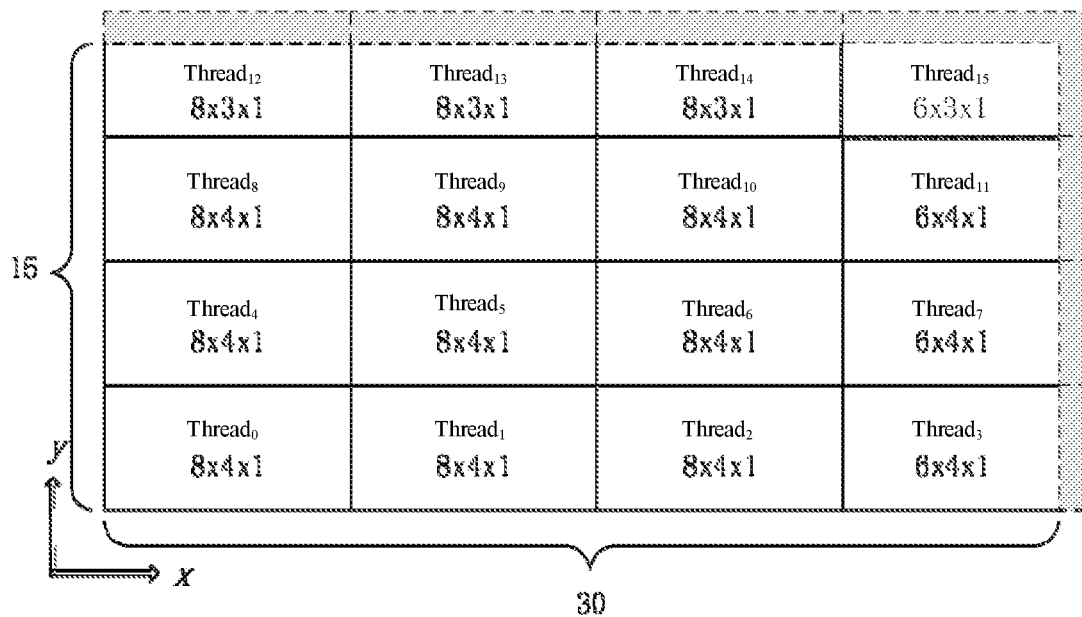
FIG. 10 is a schematic diagram of another thread construction based on the tile pattern according to another embodiment of the present disclosure.

For example, the work group size is known as 30×15×1, since 30%8=6>4, 15%4=3>2, as shown in FIG. 10, the tile pattern of 8×4×1 may be adopted, which will create 16 CS Threads: Ceil (30/8)*Ceil (15/4)*1=16. However, the 7 threads near x and y edges are not fully loaded, which are the reminder threads.

The key work item is the first work item in the work item sequence of each of the threads, and the work item index corresponding to at least one key work item in each of the threads is recorded, including: the work group index, the local index and the global index corresponding to the first work item are acquired; the work item index corresponding to the key work item is determined according to the work group index, the local index and the global index; the work item index corresponding to the key work item is cached to the cache unit.

In another embodiment, the method further includes: the work item index of the thread is read in the cache unit; the thread construction pattern adopted for thread construction is determined, and the work item corresponding to any work item is determined according to the thread construction pattern and the work item index of the thread; the work item index corresponding to the any work item is configured to schedule the any work item to the processing unit responsible for processing the thread.

The any work item may refer to all work items in the work item sequence of the thread, or may refer to at least one work item in the work item sequence.

In the specific implementation, the graphics processor reads the work item index of the thread in the cache unit, and determines the thread construction pattern adopted for thread construction; then, the graphics processor is capable of determining the work item index corresponding to any work item according to the thread construction pattern and the work item index. Specifically, the graphics processor may determine the index offset between the any work item and the key work item in the thread according to the thread construction pattern; then, the graphics processor is capable of deducing the work item index corresponding to the any work item according to the index offset and the work item index of the key work item. The graphics processor may subsequently schedule the any work item to the processing unit responsible for processing the thread based on the work item index corresponding to the any work item, so as to perform general computation on the any work item.

The technical solution of the present disclosure may just need to adopt the work item index of the thread, that is, the work item index corresponding to the key work item in the thread, and then the work item index corresponding to any one of the work items in the thread can be synchronously calculated based on the thread construction pattern adopted later, such that when the thread constructor constructs a SIMD thread, it does not need to generate the corresponding work item index for each of the work items one by one, which reduces the calculation time of the thread constructor.

In another embodiment, that the work item index corresponding to any work item is determined includes: a type of the thread construction pattern is acquired; offset information between the any work item and the first work item is determined according to the type of the thread construction pattern; the work item index corresponding to the any work item is calculated according to the offset information and the work item index corresponding to the first work item.

The offset table information may refer to information corresponding to an index offset between any one of the work items and the first work item. In practical applications, the index offset information between any one of the work items and the first work item may be recorded in the index offset table corresponding to the first work item. In this way, the graphics processor may quickly determine the index offset information between any work item and the first work item subsequently based on the index offset table.

In a specific implementation, in the process of determining the work item index corresponding to any work item, the graphics processor may acquire the offset table information corresponding to the thread construction pattern. Specifically, the graphics processor may acquire the type of the thread construction pattern (that is, the pattern type of the target thread construction pattern); then, the offset information between any work item and the first work item is determined according to the type of the thread construction pattern. Specifically, the graphics processor may acquire the index offset table corresponding to the thread construction pattern type, and determine the offset information between any one of the work items and the first work item based on the index offset table; the graphics processor calculates the work item index corresponding to any one of the work items according to the offset information and the work item index corresponding to the first work item.

It should be noted that the graphics processor determines the offset information between any one of the work items and the first work item based on the index offset table; the specific process of calculating the work item index corresponding to any one of the work items by the graphics processor according to the offset information and the work item index corresponding to the first work item may refer to the descriptions in the aforementioned Table 3, Table 4, Table 7 and Table 8, and will not be described here.

Figure 11:
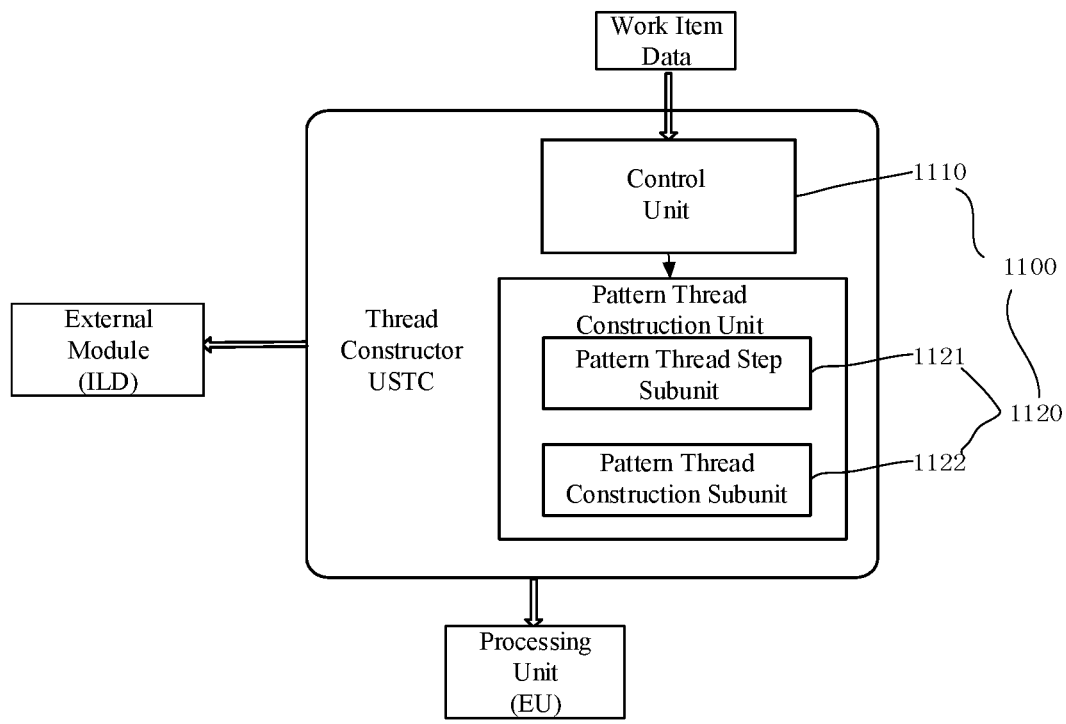
FIG. 11 is a thread construction device according to an embodiment of the present disclosure.

FIG. 11 is a thread construction device in an embodiment of the present disclosure. As shown in FIG. 11, the thread constructor 1100 includes a control unit 1110 and a pattern thread construction unit 1120.

The control unit 1110 is configured to divide the workload into a plurality of work groups; for any work group, the pattern type that matches the size of the any work group is selected, and the target thread construction pattern is determined from a plurality of candidate thread construction patterns corresponding to the pattern type.

The pattern thread construction unit 1120 is configured to perform the construction of a plurality of threads according to the target thread construction pattern; the threads are composed of a plurality of consecutive work items in the any work group.

The pattern thread construction unit 1120 is further configured to cache the work item index corresponding to at least one key work item in the work item sequence of each of the threads to an external module ILD (input Load) to obtain the work item index of each of the threads, which is used for scheduling any one of the work items in the corresponding thread to the processing unit responsible for processing the thread.

In another embodiment, the pattern thread construction unit 1120 includes a pattern thread step subunit 1121 and a pattern thread construction subunit 1122.

The pattern thread step subunit 1121 is configured to perform acquiring the step pitch in at least one direction corresponding to the thread construction pattern.

The pattern thread construction subunit 1122 is configured to perform construction of a plurality of consecutive work items in any work group into a plurality of threads according to the step pitch.

It should be noted that, for the specific definition of the aforementioned thread constructor, reference may be made to the specific definition of the aforementioned thread construction method, which will not be repeated here.

Figure 12:
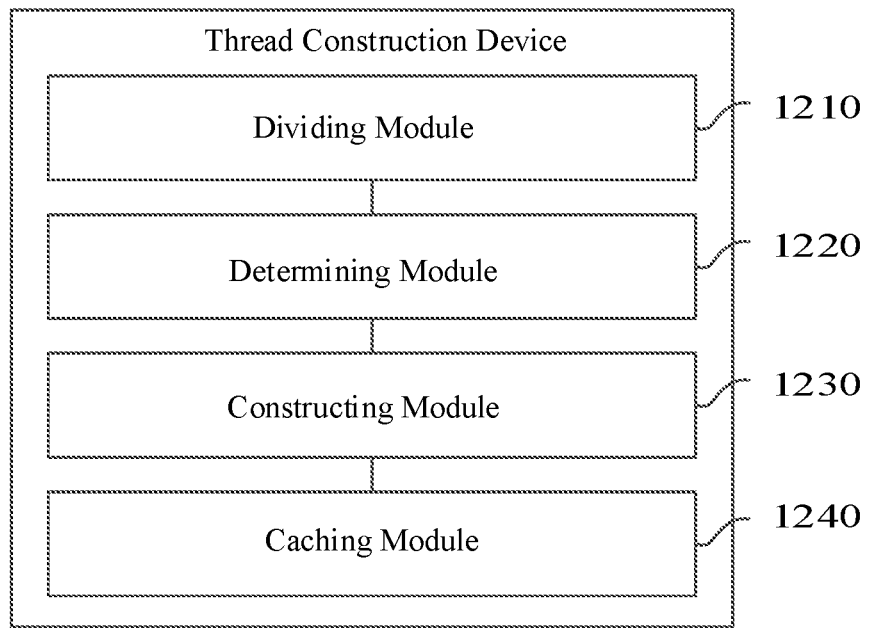
FIG. 12 is a thread construction device according to another embodiment of the present disclosure.

FIG. 12 is a thread construction device according to an embodiment of the present disclosure. As shown in FIG. 12, a thread construction device is provided, including a dividing module 1210, a determining module 1220, a constructing module 1230 and a caching module 1240.

The dividing module 1210 is configured to divide the workload into a plurality of work groups.

The determining module 1220 is configured to, for any work group, select a pattern type that matches the size of the any work group, and determine a target thread construction pattern from the plurality of candidate thread construction patterns corresponding to the pattern type.

The constructing module 1230 is configured to construct a plurality of threads according to the target thread construction pattern; wherein the threads are composed of a plurality of consecutive work items in the any work group.

The caching module 1240 is configured to cache the work item index corresponding to at least one key work item in the work item sequence of each of the threads, and obtain the work item index of each of the threads; wherein the work item index is configured to schedule any one of the work items corresponding to the thread to the processing unit responsible for processing the thread.

In one of the embodiments, the determining module 1220 is specifically configured to acquire the step pitch of each of the candidate thread construction patterns in at least one direction in the computing space; determining, according to each of the step pitch and the work group size, a candidate thread construction pattern whose quantitative relationship between the step pitch and the work group size satisfies a preset condition, as the target thread construction pattern.

In one of the embodiments, the constructing module 1230 is specifically configured to acquire the step pitch of the target thread construction pattern in at least one direction in the computing space. A plurality of consecutive work items in the any work group is constructed into a plurality of threads according to the step pitch.

In one of the embodiments, the key work item is the first work item in each of the threads, and the caching module 1240 is specifically configured to acquire the work group index, the local index and the global index corresponding to the first work item; the work item index corresponding to the key work item is determined according to the work group index, the local index and the global index; the key work item index is cached to a cache unit.

In one of the embodiments, the device further includes a reading module and a computing module. The reading module is configured to read the work item index of the thread in the cache unit. The computing module is configured to determine the thread construction pattern configured to construct the thread, and determine a work item index corresponding to any work item according to the thread construction pattern and the work item index of the thread. The work item index corresponding to any work item is configured to schedule the any work item to the processing unit responsible for processing the thread.

In one of the embodiments, the computing module is specifically configured to acquire the thread construction pattern type, determine the offset information between the any work item and the first work item according to the thread construction pattern type, and calculate the work item index corresponding to the any work item according to the offset information and the work item index corresponding to the first work item.

Each of the modules in the aforementioned thread construction device may be implemented in whole or in part by software, hardware, and combinations thereof. The aforementioned modules can be embedded in or independent of the processor in the computer device in the form of hardware, or stored in the memory in the computer device in the form of software, such that the processor can call and execute the operations corresponding to the aforementioned modules.

Figure 13:
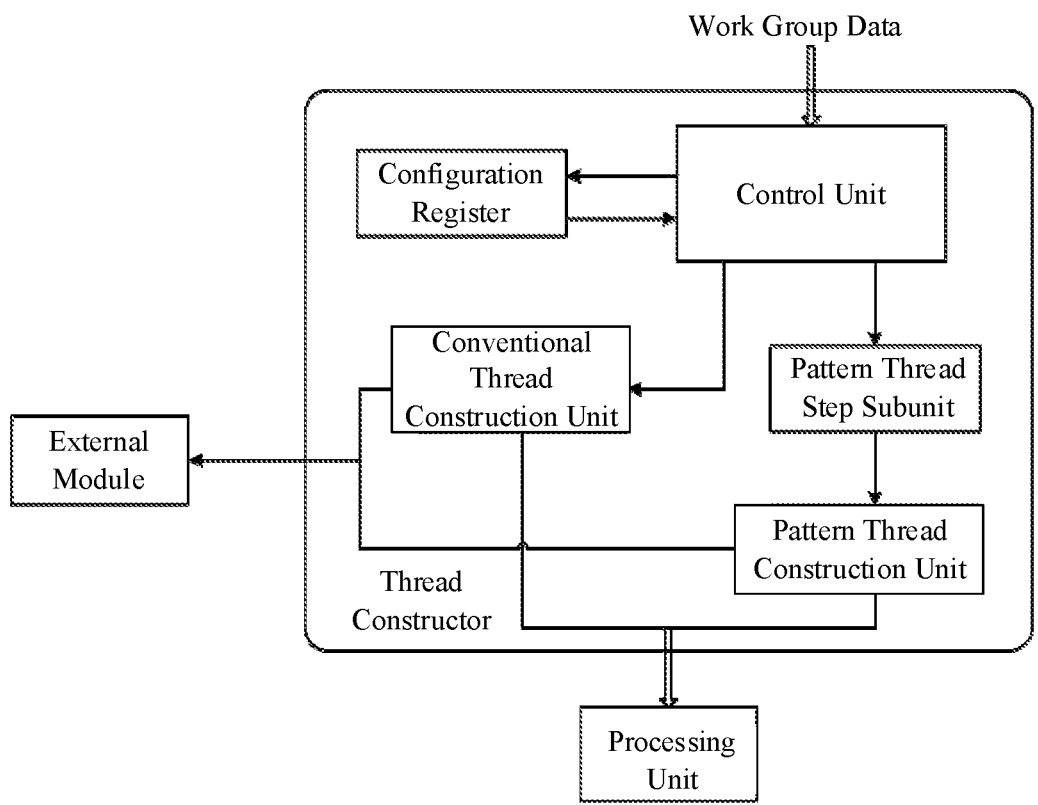
FIG. 13 is a schematic diagram of a graphics processor according to an embodiment of the present disclosure.

FIG. 13 is a schematic diagram of a graphics processor according to an embodiment of the present disclosure. As shown in FIG. 13, the graphics processor includes an external module (ILD), a thread constructor (CSTC), and an execution module. The thread constructor includes a configuration register, a control unit, a conventional thread construction unit, and a pattern thread construction unit. The pattern thread constructing unit includes a pattern thread stepping subunit and a pattern thread construction subunit. The configuration register is configured to store some information to assist CS thread construction, including SIMD32/64, pattern type, global size, local size, and so on.

The control unit is configured to receive input data, distribute tasks, judge and apply the pattern type, and so on.

The conventional thread construction unit is configured to construct each of the work items step by step by adopting the thread construction method of the conventional technology.

The pattern thread stepping subunit is configured to determine the stepping in a certain direction of the pattern, which is configured for the pattern-based thread construction.

The pattern thread construction subunit is configured to support the linear pattern and the tile pattern based on the pattern thread construction unit.

The external module (ILD) is configured to record thread item information which is called when shader executes.

The execution module (processing unit) is configured to process all threads and execute the corresponding shader.

It should be understood that, although the steps in the flowcharts involved in the aforementioned embodiments are sequentially displayed according to the arrows, these steps are not necessarily executed sequentially according to the arrows. Unless explicitly stated herein, the execution of these steps is not strictly limited to the order, and these steps may be performed in other orders. Moreover, at least a part of the steps in the flowcharts involved in the aforementioned embodiments may include multiple steps or multiple stages, and these steps or stages are not necessarily executed and completed at the same time, but may be performed at different times. The execution order of these steps or stages is not necessarily sequential, but may be performed by turns or alternately with other steps or at least a part of the steps or stages in the other steps.

Based on the same inventive concept, an embodiment of the present disclosure provides a thread construction device configured to implement the aforementioned thread construction method. The implementation solution for solving the problem provided by the device is similar to the implementation solution described in the aforementioned method, so the specific limitations in the embodiments of the provided one or more thread construction devices can refer to the above definitions for the thread construction method, which will not be repeated here.

Based on the same inventive concept, an embodiment of the present disclosure further provides a computer-readable storage medium. One or more non-transitory computer-readable storage media includes computer-executable instructions, when the computer-executable instructions are executed by one or more processors, the processors perform the aforementioned thread construction method.

The technical features of the aforementioned embodiments can be combined arbitrarily. For the sake of brevity, all possible combinations of the technical features in the aforementioned embodiments are not described. However, as long as there is no contradiction in the combination of these technical features, it is considered to be the scope described in this specification.

The aforementioned embodiments only represent several embodiments of the present disclosure, and the descriptions thereof are relatively specific and detailed, but should not be construed as a limitation on the scope of the patent of the present disclosure. It should be noted that, for a person of ordinary skill in the art, several variations and improvements may be made without departing from the concept of the present disclosure, and these are all within the protection scope of the present disclosure. Therefore, the scope of protection of the present disclosure should be determined by the appended claims.

What is claimed is:

1. A thread construction method, comprising:
dividing a workload into a plurality of work groups;
for any work group of the plurality of work groups, selecting a pattern type that matches a size of the any work group, and determining a target thread construction pattern from a plurality of candidate thread construction patterns corresponding to the pattern type;
constructing a plurality of threads according to the target thread construction pattern; the plurality of threads being composed of a plurality of consecutive work items in the any work group; and
caching a work item index corresponding to at least one key work item in the work item sequence of each of the plurality of threads, and obtaining a work item index of each of the plurality of threads, the work item index being configured for scheduling any work item of a corresponding thread to a processing unit responsible for processing the thread.

2. The method according to claim 1, wherein the determining the target thread construction pattern comprises:
acquiring a step pitch of each of the candidate thread construction patterns in at least one direction in a computing space; and
determining, according to each step pitch and the size of the work group, a candidate thread construction pattern, whose quantitative relationship between the step pitch and the size of the work group satisfies a preset condition, as the target thread construction pattern.

3. The method according to claim 2, wherein the plurality of work groups comprise a complete work group and a remainder work group; wherein a size of the complete work group is preset according to the step pitch, and a size of the remainder work group refers to a size of an incomplete work group remained after the workload is divided according to the step pitch.

4. The method according to claim 1, wherein the constructing the plurality of threads according to the target thread construction pattern comprises:

acquiring a step pitch of the target thread construction pattern in at least one direction in a computing space; and constructing the plurality of consecutive work items in the any work group into the plurality of threads according to the step pitch.

5. The method according to claim 1, wherein the key work item is a first work item in each of the threads, and the caching the work item index corresponding to at least one key work item in the work item sequence of each of the plurality of threads to obtain the work item index of each of the plurality of threads comprises:

acquiring a work group index, a local index and a global index corresponding to the first work item;

determining a work item index corresponding to the key work item according to the work group index, the local index and the global index; and caching the key work item index to a cache unit.

6. The method according to claim 5, further comprising:

reading a work item index of the thread in the cache unit; and determining the thread construction pattern configured to construct the thread, and determining a work item index corresponding to the any work item according to the thread construction pattern and the work item index of the thread; the work item index corresponding to the any work item is configured for scheduling the any work item to the processing unit responsible for processing the thread.

7. The method according to claim 6, wherein the determining the work item index corresponding the any work item comprises:

acquiring a thread construction pattern type;

determining offset information between the any work item and the first work item according to the thread construction pattern type;

calculating a work item index corresponding to the any work item according to the offset information and the work item index corresponding to the first work item.

8. The method according to claim 1, wherein the pattern type is selected from a group consisting of a linear pattern and a tile pattern.

9. A thread construction device, comprising:

at least one processor; and at least one memory communicatively connected with the at least one processor; wherein, the at least one memory stores an instruction executable by the at least one processor, and the instruction is executed by the at least one processor to cause the at least one processor to perform a thread construction method comprising:

dividing a workload into a plurality of work groups;

for any work group of the plurality of work groups, selecting a pattern type that matches a size of the any work group, and determining a target thread construction pattern from a plurality of candidate thread construction patterns corresponding to the pattern type;

constructing a plurality of threads according to the target thread construction pattern; the plurality of threads being composed of a plurality of consecutive work items in the any work group; and caching a work item index corresponding to at least one key work item in the work item sequence of each of the plurality of threads, and obtaining a work item index of each of the plurality of threads, the work item index being configured for scheduling any work item of a corresponding thread to a processing unit responsible for processing the thread.

10. The device according to claim 9, wherein the determining the target thread construction pattern comprises:

acquiring a step pitch of each of the candidate thread construction patterns in at least one direction in a computing space; and determining, according to each step pitch and the size of the work group, a candidate thread construction pattern, whose quantitative relationship between the step pitch and the size of the work group satisfies a preset condition, as the target thread construction pattern.

11. The device according to claim 10, wherein the plurality of work groups comprise a complete work group and a remainder work group; wherein a size of the complete work group is preset according to the step pitch, and a size of the remainder work group refers to a size of an incomplete work group remained after the workload is divided according to the step pitch.

12. The device according to claim 9, wherein the constructing the plurality of threads according to the target thread construction pattern comprises:

acquiring a step pitch of the target thread construction pattern in at least one direction in a computing space; and constructing the plurality of consecutive work items in the any work group into the plurality of threads according to the step pitch.

13. The device according to claim 9, wherein the key work item is a first work item in each of the threads, and the caching the work item index corresponding to at least one key work item in the work item sequence of each of the plurality of threads to obtain the work item index of each of the plurality of threads comprises:

acquiring a work group index, a local index and a global index corresponding to the first work item;

determining a work item index corresponding to the key work item according to the work group index, the local index and the global index; and caching the key work item index to a cache unit.

14. The device according to claim 13, further comprising:

reading a work item index of the thread in the cache unit; and determining the thread construction pattern configured to construct the thread, and determining a work item index corresponding to the any work item according to the thread construction pattern and the work item index of the thread; the work item index corresponding to the any work item is configured for scheduling the any work item to the processing unit responsible for processing the thread.

15. The device according to claim 14, wherein the determining the work item index corresponding the any work item comprises:

acquiring a thread construction pattern type;

determining offset information between the any work item and the first work item according to the thread construction pattern type;

calculating a work item index corresponding to the any work item according to the offset information and the work item index corresponding to the first work item.

16. The device according to claim 9, wherein the pattern type is selected from a group consisting of a linear pattern and a tile pattern.

17. A non-transitory computer-readable storage medium storing a computer instruction, wherein the computer instruction is configured to cause the computer to perform a thread construction method comprising:

dividing a workload into a plurality of work groups;

for any work group of the plurality of work groups, selecting a pattern type that matches a size of the any work group, and determining a target thread construction pattern from a plurality of candidate thread construction patterns corresponding to the pattern type;

constructing a plurality of threads according to the target thread construction pattern; the plurality of threads being composed of a plurality of consecutive work items in the any work group; and caching a work item index corresponding to at least one key work item in the work item sequence of each of the plurality of threads, and obtaining a work item index of each of the plurality of threads, the work item index being configured for scheduling any work item of a corresponding thread to a processing unit responsible for processing the thread.

\* \* \* \* \*